(12) United States Patent
Kochar et al.

(10) Patent No.: US 8,140,835 B2
(45) Date of Patent: Mar. 20, 2012

(54) UPDATING A BASIC INPUT/OUTPUT SYSTEM ('BIOS') BOOT BLOCK SECURITY MODULE IN COMPUTE NODES OF A MULTINODE COMPUTER

(75) Inventors: Sumeet Kochar, Apex, NC (US); Jeffrey B. Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/118,233

(22) Filed: May 9, 2008

(65) Prior Publication Data

US 2009/0327686 A1 Dec. 31, 2009

(51) Int. Cl.
*G06F 15/177* (2006.01)
(52) U.S. Cl. .......................................................... 713/1
(58) Field of Classification Search .................. 713/1
See application file for complete search history.

(56) References Cited

U.S. PATENT DOCUMENTS

| | | | |
|---|---|---|---|
| 6,219,697 B1 * | 4/2001 | Lawande et al. ............. | 709/221 |
| 6,516,372 B1 * | 2/2003 | Anderson et al. ............. | 710/300 |
| 6,708,231 B1 * | 3/2004 | Kitagawa ....................... | 710/10 |
| 6,754,828 B1 * | 6/2004 | Marisetty et al. ............. | 726/2 |
| 6,904,457 B2 * | 6/2005 | Goodman ...................... | 709/221 |
| 6,934,873 B2 * | 8/2005 | Lu et al. ........................ | 714/2 |
| 7,000,101 B2 * | 2/2006 | Wu et al. ....................... | 713/1 |
| 7,171,568 B2 * | 1/2007 | Dayan et al. .................. | 713/300 |
| 7,219,343 B2 * | 5/2007 | Almeida et al. ............... | 717/172 |
| 7,363,434 B2 * | 4/2008 | Polyudov ....................... | 711/147 |
| 2005/0108564 A1 | 5/2005 | Freeman et al. | |
| 2006/0010326 A1 | 1/2006 | Bade et al. | |
| 2007/0260866 A1 | 11/2007 | Wang et al. | |

OTHER PUBLICATIONS

Eisenbarth, et al.; Reconfigurable Trusted Computing in Hardware; Nov. 2, 2007; STC '07; ACM' Alexandria, Virginia; USA.

* cited by examiner

*Primary Examiner* — Kim Huynh
*Assistant Examiner* — Eric Chang
(74) *Attorney, Agent, or Firm* — Brandon C. Kennedy; Cynthia G. Seal; Biggers & Ohanian, LLP.

(57) ABSTRACT

Updating a BIOS boot block security module in a plurality of compute nodes of a multinode computer including, for each compute node in the multinode computer, upon powering on the compute node: determining whether a new image of security module is available; if a new image of the security module is available, commanding the reset control module of the compute node to block an attempt by the security module to propagate a reset signal on the scalability bus to other compute nodes in the multinode computer; updating to the new image of the security module; upon completion of the update, resetting the compute node including attempting to propagate a reset signal on the scalability bus to other compute nodes in the multinode computer; and blocking the attempt to propagate the reset signal on the scalability bus.

20 Claims, 2 Drawing Sheets

UPDATING A BASIC INPUT/OUTPUT SYSTEM ('BIOS') BOOT BLOCK SECURITY MODULE IN COMPUTE NODES OF A MULTINODE COMPUTER

BACKGROUND OF THE INVENTION

1. Field of the Invention

The field of the invention is data processing, or, more specifically, methods, apparatus, and products for updating a basic input/output system ('BIOS') boot block security module in a plurality of compute nodes of a multinode computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In typical multinode systems a BIOS boot block of code may be updated in each node upon power-on of each node. Each of the nodes may complete the update asynchronously such that one node may complete the update first. Upon such a first completion of the update in a node, the boot block causes the node to reset. Such a reset typically causes a reset signal to be sent to other nodes in the multinode system causing those nodes to reset also, and in some cases, reset before completing the BIOS boot block update. Such a failed update may cause many errors in operation including complete node failure.

SUMMARY OF THE INVENTION

Methods, apparatus, and products for updating a basic input/output system ('BIOS') boot block security module ('security module') in a plurality of compute nodes of a multinode computer, the plurality of compute nodes connected through a scalability bus for operation as a single computer, each compute node comprising a reset control module for controlling propagation of reset signals among the compute nodes through the scalability bus, including, for each compute node in the multinode computer, upon powering on the compute node: determining, by the security module of the compute node, whether a new image of security module is available; if a new image of the security module is available, commanding, by the security module, the reset control module of the compute node to block an attempt by the security module to propagate a reset signal on the scalability bus to other compute nodes in the multinode computer; updating, by the security module, to the new image of the security module; upon completion of the update, resetting, by the security module, the compute node including attempting to propagate a reset signal on the scalability bus to other compute nodes in the multinode computer; and blocking, by the reset control module, the attempt to propagate the reset signal on the scalability bus.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
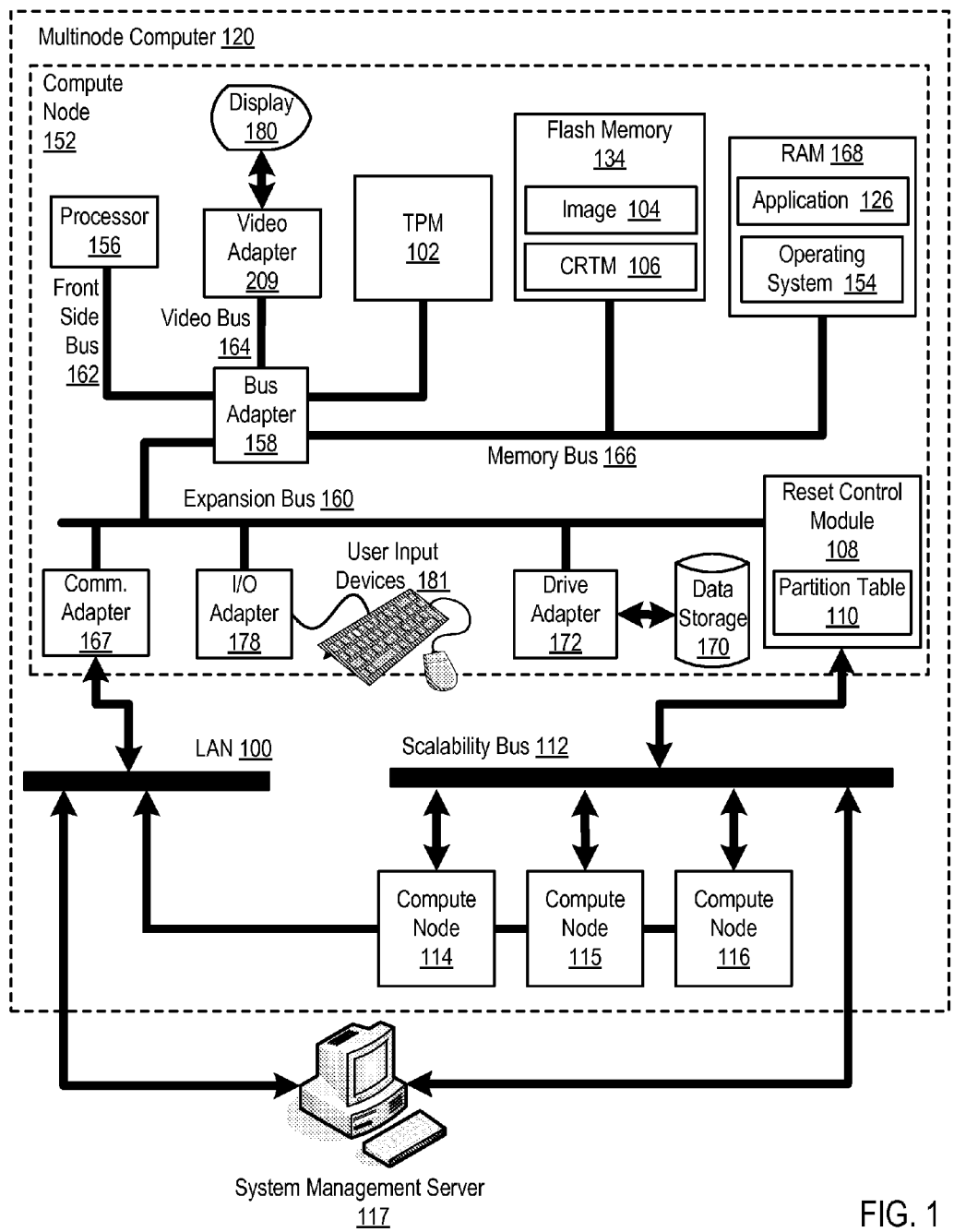
FIG. 1 sets forth a functional block diagram of an exemplary system for updating a BIOS boot block security module in a plurality of compute nodes of a multinode computer according to embodiments of the present invention.

Exemplary methods, apparatus, and products for updating a basic input/output system ('BIOS') boot block security module ('security module') in a plurality of compute nodes of a multinode computer in accordance with the present invention are described with reference to the accompanying drawings, beginning with FIG. 1. FIG. 1 sets forth a functional block diagram of an exemplary system for updating a BIOS boot block security module in a plurality of compute nodes of a multinode computer (120) according to embodiments of the present invention.

The term 'BIOS' refers to the firmware code, a module of computer program instructions, executed in a computer, such as a compute node, when the computer is powered on. BIOS can also be said to be a module of computer program instructions embedded on a chip that recognizes and controls various devices in a computer. A function of the BIOS includes identifying and initiating hardware components, such as a hard disk, floppy drive, and optical disk drives for example. The identification and initiation of such hardware components by BIOS prepares the computer such that other software programs stored on various media can load, execute, and assume control of the computer to varying degrees. The process of loading such software programs, executing such software programs, and assuming control of the computer by such software programs is typically referred to as booting, or booting up, which is short for bootstrapping.

A multinode computer is an aggregation of a group of compute nodes where the compute nodes are capable of operating together as a single computer thereby harnessing the collective data processing power, memory, I/O functions, and other capabilities of each compute node in the group. A compute node is automated computing machinery capable of operating with other compute nodes as a single, multinode computer.

The system of FIG. 1 includes four compute nodes (114, 115, 116, 152) connected through a scalability bus (112). A scalability bus is any data communications connection between two or more compute nodes used in administering multinode computer operation among the compute nodes. The scalability bus may include primary, in-band data communications signal lines and secondary, out-of-band data communications signal lines. A scalability bus may be implemented with an I2C bus, a System Management Bus ('SMBus'), a Serial Peripheral Interface Bus ('SPI'), Ethernet, Small Computer System Interface ('SCSI') connection, or any other data communications link as will occur to those of skill in the art.

Each of the example computer nodes of FIG. 1 may also include a scalability controller, an aggregation of synchronous and asynchronous logic implemented in the bus adapter (158) of the computer system that controls in-band communications between devices along the scalability bus. The scalability controller controls such primary, in-band data communications along the scalability bus among the compute nodes as general purpose input/output, memory accesses, PCI accesses, and so on.

Each of the example compute nodes (114, 115, 116, 152) of FIG. 1 also includes a reset control module (108). A reset control module is an aggregation of computer hardware and software capable of controlling propagation of reset signals among the compute nodes through the scalability bus. The reset control module may also control other out-of-band communications along the scalability bus (112). Such out-of-band communications may include power sequencing signals, reset propagation signals, system management signals, and so on.

The system of FIG. 1 also includes a system management server (117). A system management server (117) is an aggregation of computer hardware and software that provides services common to the compute nodes, administering the configuration of compute nodes, loading programs into the compute nodes, starting program execution on the compute nodes, retrieving results of program operations on the computer nodes, and so on. The system management server in the system of FIG. 1 is connected for data communications to the compute nodes (114, 115, 116, 152) through the LAN (100) and through the scalability bus (112).

In the system of FIG. 1, the system management server (117) may organize the compute nodes (114, 115, 116, 152) for operation as a single, multinode computer (120) by assigning each compute node a partition ID where the partition ID is stored in a partition table (110) of a reset control module (108) in each compute node. Such a partition ID uniquely identifies a particular multinode computer of which the compute node is a part. A partition ID uniquely identifies a particular multinode computer because all compute nodes of one multinode computer are assigned a particular partition ID while all compute nodes of a different multinode computer are assigned a different partition ID. Compute node (114) and compute node (115), for example, may be assigned one partition ID while compute node (116) and compute node (152) are assigned a different partition ID. In such a configuration, the compute nodes (114,115) will operate together as a single, multinode computer and the compute nodes (116, 152) will operate together as a different single, multinode computer.

In organizing the compute nodes for operation as a single, multinode computer (120), the system management server (117) may also assign at least one of the compute nodes as a primary compute node. A primary compute nodes is a compute node that, when operating with other compute nodes as a single, multinode computer (120), administers data communications on behalf of the group of compute nodes, administers workload distribution among the compute nodes, administer power management among the compute nodes, and so on as will occur to those of skill in the art. In some embodiments the primary compute node is the compute node through which a user directly interfaces, while other compute nodes provide data processing power and memory.

The compute node (152) of FIG. 1 includes at least one computer processor (156) or 'CPU' as well as random access memory (168) ('RAM') which is connected through a high speed memory bus (166) and bus adapter (158) to processor (156) and to other components of the compute node (152). Stored in RAM (168) is a software application (126), a set of computer program instructions that carries out user-level data processing tasks. Examples of such software applications include database management systems, word processors, spreadsheet applications, media editing applications and the like. In a multinode computer, each compute node may be assigned to execute a different application in parallel, may be assigned to execute a different portion of the same application, may be assigned to execute the same portion of the same application beginning with different input data on which to work, and so on.

Also stored in RAM (168) is an operating system (154). Operating systems useful in a multinode computer that updates a BIOS boot block security module in a plurality of compute nodes of a multinode computer according to embodiments of the present invention include UNIX™, Linux™, Microsoft XP™, Microsoft Vista™, AIX™, IBM's i5/OS™, and others as will occur to those of skill in the art. The operating system (154) and the software application (126) in the example of FIG. 1 are shown in RAM (168), but many components of such software typically are stored in non-volatile memory also, such as, for example, on a disk drive (170) or in flash memory (134).

Each of the compute nodes (114, 115, 116, 152) in the multinode computer (120) of FIG. 1 also include a security device (102), an aggregation of computer hardware and software that provides one or more security measures for protecting a computer system. In the example compute node (152) the security device is depicted as a trusted platform module ('TPM') (102). A TPM offers facilities for the secure generation of cryptographic keys, and limitation of their use, in addition to a pseudo-random number generator. The TPM may also include other capabilities such as remote attestation and sealed storage. Remote attestation creates a nearly unbreakable hash key summary of hardware and software configuration of the computer system in which the TPM is installed. The extent of the summary of the software is decided by the program encrypting the data. This allows a third party to verify that the software has not been changed. Sealing encrypts data in such a way that it may be decrypted only if the TPM releases the associated decryption key, which it only does if the exact same software is present as that present when the data was encrypted. Binding encrypts data using the TPM endorsement key, a unique RSA key burned into the chip during its production, or another trusted key descended from it.

A TPM may also authenticate hardware devices of the computer system in which the TPM is installed. Because each TPM has a unique and secret RSA key burned in as it is produced, the TPM is capable of performing platform authentication. A TPM may, for example, verify that a system seeking access to some portion of the computer system in which the TPM is installed is an expected and trusted system.

The TPM (102) in the example of FIG. 1, upon powering-on the compute node (152), executes a BIOS boot block security module. A BIOS boot block security module as the term is used in this specification is a module of computer program instructions, typically a small portion of BIOS, that is run before other portions of BIOS and verifies that the BIOS is intact using hash checksums and the like. Because the BIOS boot block security module is typically the first set of computer program instructions executed after powering-on a computer system or compute node, the integrity of the BIOS boot block security module should be maintained for security, stability, and so on. In fact, if errors exist in the BIOS boot block security module, the computer system may be completely non-operational. From time to time, however, the BIOS boot block security module may be updated. Because integrity of the BIOS boot block security module should be maintained, such an update is typically carried out by the boot block security module itself as other modules of compute program instructions may not be trusted. One example of such a BIOS boot block security module is the Core Root of Trust for Measurement ('CRTM') (106) stored in flash memory (134) of the compute node (152) in FIG. 1. CRTM is a BIOS boot block for computer systems implementing TPM.

As mentioned above, from time to time the computer program instructions of the security module (106) may be updated in each compute node of the multinode computer. The system of FIG. 1 operates generally for updating such a BIOS boot block security module (106) in accordance with embodiments of the present invention by, for each compute node in the multinode computer, upon powering on the compute node: determining, by the security module (106) of the compute node (152), whether a new image (104) of security module (106) is available, if a new image (104) of the security module (106) is available, commanding, by the security module (106), the reset control module (108) of the compute node (152) to block an attempt by the security module (102) to propagate a reset signal on the scalability bus (112) to other compute nodes in the multinode computer (120); updating, by the security module (106), to the new image (104) of the security module (106); upon completion of the update, resetting, by the security module (106), the compute node including attempting to propagate a reset signal on the scalability bus (112) to other compute nodes (114, 115, 116) in the multinode computer (120) and blocking, by the reset control module (108), the attempt to propagate the reset signal on the scalability bus.

The compute node (152) of FIG. 1 also includes disk drive adapter (172) coupled through expansion bus (160) and bus adapter (158) to processor (156) and other components of the compute node (152). Disk drive adapter (172) connects non-volatile data storage to the compute node (152) in the form of disk drive (170). Disk drive adapters useful in compute nodes for updating a basic input/output system ('BIOS') boot block security module in a plurality of compute nodes of a multinode computer according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example compute node (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute node (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary compute node (152) of FIG. 1 includes a communications adapter (167) for data communications with other compute nodes (114,115,116) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for updating a basic input/output system ('BIOS') boot block security module in a plurality of compute nodes of a multinode computer according to embodiments of the present invention include modems for wired dial-up communications, Ethernet (IEEE 802.3) adapters for wired data communications network communications, and 802.11 adapters for wireless data communications network communications.

The arrangement of servers, compute nodes, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
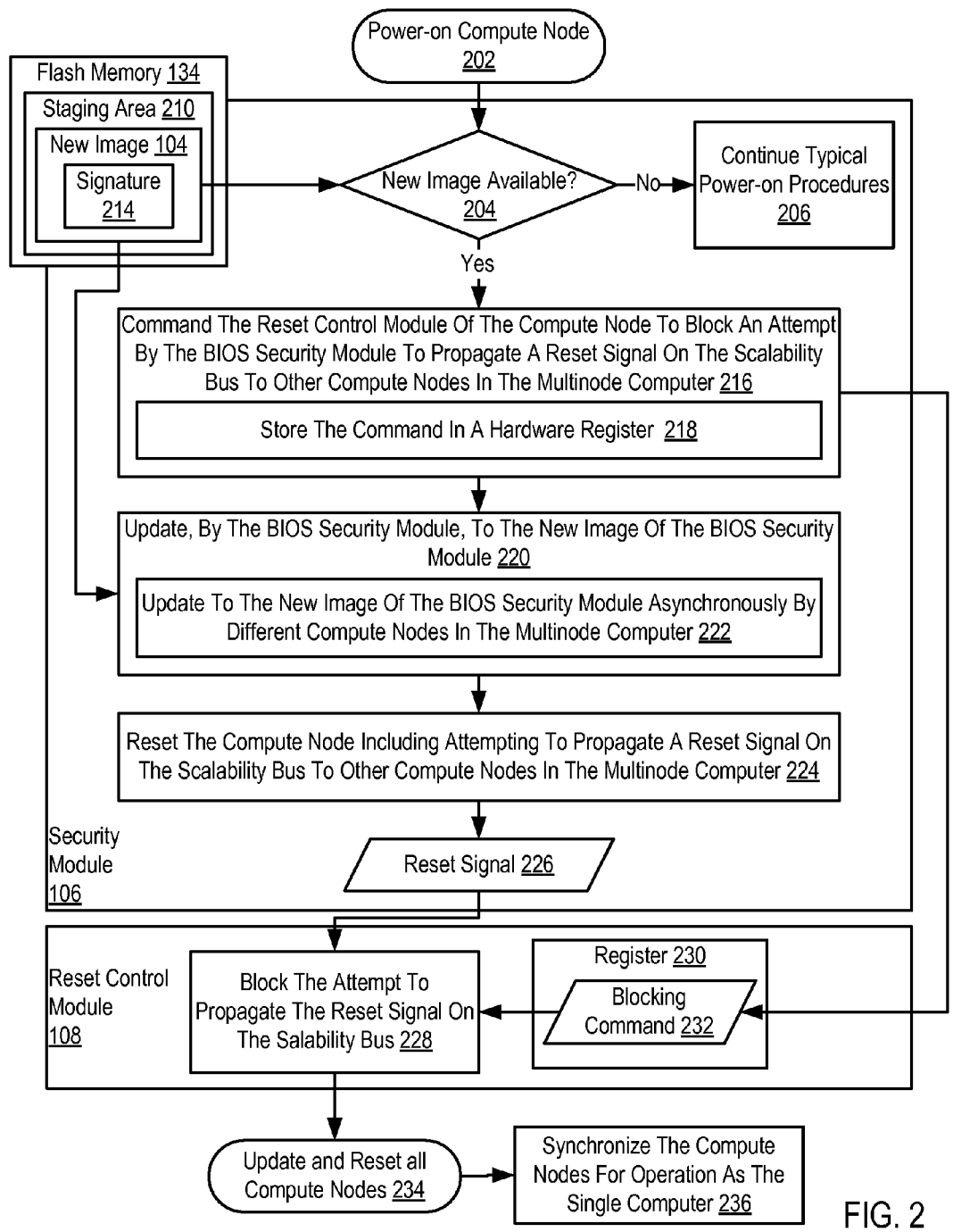
FIG. 2 sets forth a flow chart illustrating an exemplary method for updating a BIOS boot block security module in a plurality of compute nodes of a multinode computer according to embodiments of the present invention.

For further explanation, FIG. 2 sets forth a flow chart illustrating an exemplary method for updating a BIOS boot block security module in a plurality of compute nodes of a multinode computer according to embodiments of the present invention. The method of FIG. 2 is implemented in a multinode computer similar to the multinode computer (120) depicted in the example of FIG. 1 in that the method of FIG. 2 is implemented in a multinode computer that includes a plurality of compute nodes (114, 115, 116, 152 on FIG. 1) where the compute nodes are connected through a scalability bus (112 on FIG. 1) for operation as a single computer. Such compute nodes also include a reset control module (108) for controlling propagation of reset signals among the compute nodes through the scalability bus. In the method of FIG. 2, the reset control module may be implemented as a field-programmable gate array ('FPGA') configured to control propagation of reset signals among the compute nodes through the scalability bus (112 on FIG. 1), an application specific integrated circuit ('ASIC') configured to control propagation of reset signals among the compute nodes through the scalability bus, or in other ways as will occur to those of skill in the art. An FPGA is a semiconductor device containing programmable logic components called "logic blocks." and programmable interconnects. Logic blocks can be programmed to perform the function of basic logic gages, such as AND, OR, and XOR, for example, or be programmed for more complex combinational functions such as decoders or mathematical functions. In most FPGAs, the logic blocks also include memory elements, which may be simple flip-flops or more complete blocks of memory, such as RAM, PROM, EEPROM, and registers.

An ASIC is an integrated circuit ('IC') customized for a particular use, rather than general-purpose use. For example, a chip designed solely to operate a cell phone is an ASIC. Modern ASICs often include entire 32-bit processors, memory blocks including ROM, RAM, EEPROM, Flash and other large building blocks. Such an ASIC is often referred to as a System-on-a-chip ('SoC'). Designers of digital ASICs use a hardware description language ('HDL'), such as Verilog or VHDL, to describe the functionality of ASICs.

For each compute node in such a multinode computer, and upon powering (202) on the compute node, the method of FIG. 2 includes determining (204), by the security module (106) of the compute node, whether a new image (104) of security module is available. An image is a set of values, typically binary values, representing computer program instructions. In this example the values represent computer program instructions for the security module (106). Such computer program instructions may be an addition to, a replacement of, or modification of one or more computer program instructions currently comprising the security module.

Determining (204), by the security module (106) of the compute node, whether a new image (104) of security module is available may be carried out by identifying a new image in a staging area (210) of flash memory (134) of the compute node and verifying a digital signature (214) included in the new image (104) of the security module (106). A staging area (210) is a segment of memory designated for storing updates. A staging area may store a particular value known to the security module at all times an update is not present. Upon powering on the compute node, the security module may identify a new image in the stage area by identifying a value other than the known particular value. Alternatively, a staging area may store a random value at all times an update is not present and all updates may include an update identifier that identifies values stored in the memory as an update. Upon powering on the compute node, the security module may identify a new image in the staging area by identifying the update identifier in the staging area.

Updates to such a BIOS boot block security module may introduce significant control and security deficiencies into a computer system. As such, an update to such a BIOS boot block security module may include one or more security measures to ensure that the update originates from a trusted source. One example of such a security measure is a digital signature. A digital signature is identifier that provides authentication of the source of the update. Such signatures may be created through use of an encryption algorithm such as a private key algorithm, public key algorithm, or other type of algorithm.

If a new image (104) of the security module (106) is available, the method of FIG. 2 continues by commanding (216), by the security module (106), the reset control module (108) of the compute node to block an attempt by the security module (106) to propagate a reset signal on the scalability bus to other compute nodes in the multinode computer. The security module (106) in the example of FIG. 2 is configured to reset the compute node in which the security module executes after completion of an update and such a reset is typically propagated throughout the compute node by issuing a reset signal through the scalability bus. If such a reset signal were, in fact propagated, each compute node in the multinode computer would reset. Updating to the new image of the security module in each compute node, however, may be completed asynchronously by different compute nodes in the multinode computer and a propagated reset signal may be cause a reset of a compute node in which the update to the security module is incomplete. Such an incomplete update may cause multiple errors in a compute node include complete failure. Commanding (216) the reset control module (108) to block an attempt by the security module (106) to propagate a reset signal on the scalability bus to other compute nodes in the multinode computer may be carried out by storing (218) the command (232) in a hardware register (230) of the reset control module (108) where the hardware register is designated for storing such commands.

The method of FIG. 2 also includes updating (222), by the security module (106), to the new image (104) of the security module (106) and upon completion of the update, resetting (224), by the security module (106), the compute node. Resetting (224) the compute node in the method of FIG. 2 includes attempting to propagate a reset signal (226) on the scalability bus to other compute nodes in the multinode computer. Such a reset signal may be implemented as a command in a data packet transmitted on the scalability bus having header information that includes the multinode computer's partition ID, as a change in voltage level, from high to low or low to high, for example, on one or more wires of the scalability bus designated for such reset signals, or in other ways as will occur to those of skill in the art.

The method of FIG. 2 also includes blocking (228), by the reset control module (108), the attempt to propagate the reset signal (226) on the scalability bus. Blocking (228) the attempt to propagate the reset signal (226) on the scalability bus may be carried out by identifying in a hardware register of the reset control module (108) a command to block such reset signals (226) and refusing to propagate the signal on the scalability bus. After refusing to propagate the signal, but before the reset of the compute node, the reset control module may also clear the hardware register such that after the reset of the compute node any further attempts to propagate a reset signal will be carried out.

After updating to the new image of the security module for each compute node and upon resetting all compute nodes in the multinode computer, that is, resetting each compute node individually, the method of FIG. 2 includes synchronizing (236) the compute nodes for operation as the single computer. Such synchronization may be carried out by a primary compute node and a system management server by controlling in-band communications between the compute nodes, between compute nodes and other multinode computers, between compute nodes and other non-multinode computer, controlling processing of applications by the compute nodes, allocation of memory of the compute nodes, and so on as will occur to those of skill in the art.

Exemplary embodiments of the present invention are described largely in the context of a fully functional computer system for updating a BIOS boot block security module in a plurality of compute nodes of a multinode computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of updating a basic input/output system ('BIOS') boot block security module ('security module') in a plurality of compute nodes of a multinode computer, the plurality of compute nodes connected through a scalability bus for operation as a single computer, each compute node comprising a reset control module for controlling propagation of reset signals among the compute nodes through the scalability bus, the method comprising:

for each compute node in the multinode computer, upon powering on the compute node:
determining, by the security module of the compute node, whether a new image of security module is available;
if a new image of the security module is available, commanding, by the security module, the reset control module of the compute node to block an attempt by the security module to propagate a reset signal on the scalability bus to other compute nodes in the multinode computer;
updating, by the security module, to the new image of the security module;
upon completion of the update, resetting, by the security module, the compute node including attempting to propagate a reset signal on the scalability bus to other compute nodes in the multinode computer; and
blocking, by the reset control module, the attempt to propagate the reset signal on the scalability bus.

2. The method of claim 1 wherein updating to the new image of the security module in each compute node is completed asynchronously by different compute nodes in the multinode computer.

3. The method of claim 1 further comprising:
after updating to the new image of the security module for each compute node and upon resetting all compute nodes in the multinode computer, synchronizing the compute nodes for operation as the single computer.

4. The method of claim 1 wherein determining, by the security module of the compute node, whether a new image of security module is available further comprises:
identifying a new image in a staging area of flash memory of the compute node; and
verifying a digital signature included in the new image of the security module.

5. The method of claim 1 wherein commanding the reset control module of the compute node to block an attempt by the security module to propagate a reset signal on the scalability bus to other compute nodes in the multinode computer further comprises storing the command in a hardware register of the reset control module, the hardware register designated for storing such commands.

6. The method of claim 1 wherein the reset control module further comprises a field-programmable gate array ('FPGA') configured to control propagation of reset signals among the compute nodes through the scalability bus.

7. The method of claim 1 wherein the reset control module further comprises an application specific integrated circuit ('ASIC') configured to control propagation of reset signals among the compute nodes through the scalability bus.

8. An apparatus for updating a basic input/output system ('BIOS') boot block security module in a plurality of compute nodes of a multinode computer, the plurality of compute nodes connected through a scalability bus for operation as a single computer, each compute node comprising a reset control module for controlling operation of the scalability bus, the apparatus comprising a computer processor, a computer memory operatively coupled to the computer processor, the computer memory having disposed within it computer program instructions capable of:

for each compute node in the multinode computer, upon powering on the compute node:
determining, by the security module of the compute node, whether a new image of security module is available;
if a new image of the security module is available, commanding, by the security module, the reset control module of the compute node to block an attempt by the security module to propagate a reset signal on the scalability bus to other compute nodes in the multinode computer;
updating, by the security module, to the new image of the security module;
upon completion of the update, resetting, by the security module, the compute node including attempting to propagate a reset signal on the scalability bus to other compute nodes in the multinode computer; and
blocking, by the reset control module, the attempt to propagate the reset signal on the scalability bus.

9. The apparatus of claim 8 wherein updating to the new image of the security module in each compute node is completed asynchronously by different compute nodes in the multinode computer.

10. The apparatus of claim 8 further comprising computer program instructions capable of:
after updating to the new image of the security module for each compute node and upon resetting all compute nodes in the multinode computer, synchronizing the compute nodes for operation as the single computer.

11. The apparatus of claim 8 wherein determining, by the security module of the compute node, whether a new image of security module is available further comprises:
identifying a new image in a staging area of flash memory of the compute node; and
verifying a digital signature included in the new image of the security module.

12. The apparatus of claim 8 wherein commanding the reset control module of the compute node to block an attempt by the security module to propagate a reset signal on the scalability bus to other compute nodes in the multinode computer further comprises storing the command in a hardware register of the reset control module, the hardware register designated for storing such commands.

13. The apparatus of claim 8 wherein the reset control module further comprises a field-programmable gate array ('FPGA') configured to control propagation of reset signals among the compute nodes through the scalability bus.

14. The apparatus of claim 8 wherein the reset control module further comprises an application specific integrated circuit ('ASIC') configured to control propagation of reset signals among the compute nodes through the scalability bus.

15. A computer program product for updating a basic input/output system ('BIOS') boot block security module in a plurality of compute nodes of a multinode computer, the plurality of compute nodes connected through a scalability bus for operation as a single computer, each compute node comprising a reset control module for controlling operation of the scalability bus, the computer program product disposed in a recordable storage medium, the computer program product comprising computer program instructions capable of:

for each compute node in the multinode computer, upon powering on the compute node:

determining, by the security module of the compute node, whether a new image of security module is available;

if a new image of the security module is available, commanding, by the security module, the reset control module of the compute node to block an attempt by the security module to propagate a reset signal on the scalability bus to other compute nodes in the multinode computer;

updating, by the security module, to the new image of the security module;

upon completion of the update, resetting, by the security module, the compute node including attempting to propagate a reset signal on the scalability bus to other compute nodes in the multinode computer; and blocking, by the reset control module, the attempt to propagate the reset signal on the scalability bus.

16. The computer program product of claim 15 wherein updating to the new image of the security module in each compute node is completed asynchronously by different compute nodes in the multinode computer.

17. The computer program product of claim 15 wherein determining, by the security module of the compute node, whether a new image of security module is available further comprises:

identifying a new image in a staging area of flash memory of the compute node; and verifying a digital signature included in the new image of the security module.

18. The computer program product of claim 15 wherein commanding the reset control module of the compute node to block an attempt by the security module to propagate a reset signal on the scalability bus to other compute nodes in the multinode computer further comprises storing the command in a hardware register of the reset control module, the hardware register designated for storing such commands.

19. The computer program product of claim 15 wherein the reset control module further comprises a field-programmable gate array ('FPGA') configured to control propagation of reset signals among the compute nodes through the scalability bus.

20. The computer program product of claim 15 wherein the reset control module further comprises an application specific integrated circuit ('ASIC') configured to control propagation of reset signals among the compute nodes through the scalability bus.

* * * * *